United States Patent [19]

Han

[11] Patent Number: 5,973,743
[45] Date of Patent: Oct. 26, 1999

[54] MODE CODING METHOD AND APPARATUS FOR USE IN AN INTERLACED SHAPE CODER

[75] Inventor: Seok-Won Han, Seoul, Rep. of Korea

[73] Assignee: Daewoo Electronics Co., Ltd., Rep. of Korea

[21] Appl. No.: 08/984,031

[22] Filed: Dec. 2, 1997

[51] Int. Cl.[6] .............................. H04N 7/30; H04N 7/50
[52] U.S. Cl. ..................... 348/416; 348/402; 348/413; 348/699; 382/243
[58] Field of Search ................................ 348/416, 384, 348/390, 400–403, 409–413, 415, 699, 407; 382/190, 232, 236, 238, 248, 249, 250, 243; H04N 7/30, 7/50

[56] References Cited

U.S. PATENT DOCUMENTS

| | | | |
|---|---|---|---|
| 5,638,127 | 6/1997 | Murakami et al. | |
| 5,767,911 | 6/1998 | Boon | 348/409 |
| 5,805,221 | 9/1998 | Lee | 348/397 |
| 5,812,787 | 9/1998 | Astle | 348/390 |
| 5,818,531 | 10/1998 | Yamaguchi | 348/403 |
| 5,905,542 | 5/1999 | Linzer | 348/699 |

FOREIGN PATENT DOCUMENTS 0577365   1/1994   European Pat. Off. .

OTHER PUBLICATIONS

N. Brady et al., "Context–Based Arithmetic Encoding of 2D Shape" Proceedings of The International Conference on Image Processing, Oct. 26–29, 1997, pp. 29–32.

Ostermann J, "Methodologies Used for Evaluation of Video Tools and Algorithms in MPEG–4" Signal Processing. Image Communication, May 1997, vol. 9, No. 4, pp. 343–365.

Sikora T, "Entwicklung Eines MPEG–4 Video–Standards: Das MPEG–4 Video–Verifikationsmodell" Fernseh Und Kinotechnik, Aug. 1996, vol. 50, No. 8/09, pp. 439/440, 442–444, 446–448.

*Primary Examiner*—Howard Britton
*Attorney, Agent, or Firm*—Anderson Kill & Olick

[57] ABSTRACT

A method for encoding mode signals of a target block of M×N pixels having a binary value '0' or '255' is provided. If the target block is determined as neither "all_0" nor "all_255", the target block is divided into a top field and a bottom field, wherein the top field contains every odd row of the target block to have M/2×N pixels and the bottom field contains every even row of the target block to have M/2×N pixels. After encoding the top field, the method encodes the bottom field based on the top field to generate modified bottom field-coded data and a modified bottom mode.

16 Claims, 5 Drawing Sheets

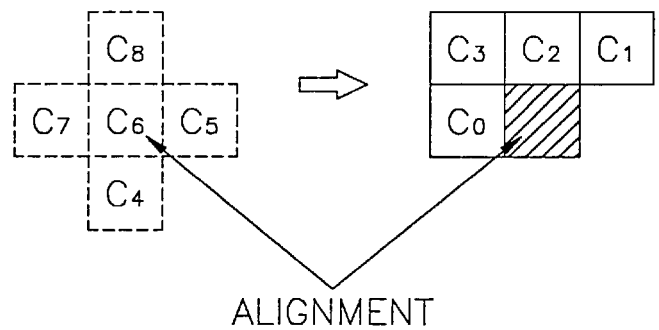

MODE CODING METHOD AND APPARATUS FOR USE IN AN INTERLACED SHAPE CODER

FIELD OF THE INVENTION

The present invention relates to a method and apparatus modify for encoding mode signals of a binary shape signal; and, more particularly, to a method and apparatus for encoding mode signals by using a correlation between two fields in an interlaced shape coder.

DESCRIPTION OF THE PRIOR ART

In digitally televised systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is necessary to compress or reduce the volume of data through the use of various data compression techniques, especially in the case of such low bit-rate video signal encoders as video-telephone and teleconference systems.

One of such techniques for encoding video signals for a low bit-rate encoding system is the so-called object-oriented analysis-synthesis coding technique, wherein an input video image is divided into objects, and three sets of parameters for defining the motion, contour and pixel data of each object are processed through different encoding channels.

One example of such object-oriented coding scheme is the so-called MPEG (Moving Picture Experts Group) phase 4 (MPEG-4), which is designed to provide an audio-visual coding standard for allowing content-based interactivity, improved coding efficiency and/or universal accessibility in such applications as low-bit rate communication, interactive multimedia (e.g., games, interactive TV, etc.) and area surveillance.

According to MPEG-4, an input video image is divided into a plurality of video object planes (VOP's), which correspond to entities in a bitstream that a user can have an access to and manipulate. A VOP can be referred to as an object and represented by a bounding rectangle whose width and height may be the smallest multiples of 16 pixels (a macroblock size) surrounding each object so that the encoder may process the input video image on a VOP-by-VOP basis.

A VOP described in MPEG-4 includes shape information and color information consisting of luminance and chrominance data, wherein the shape information represented in binary shape signals is referred to as an alpha plane. The alpha plane is partitioned into a plurality of binary alpha blocks, wherein each binary alpha block (BAB) has 16×16 binary pixels. Each of the binary pixels is classified as either a background pixel or an object pixel, wherein the background pixel located outside the object in the alpha plane is used to be assigned with a binary pixel value, e.g., 0, while the object pixel inside the object is used to be assigned with another binary pixel value, e.g., 255.

Each of the binary pixels in the BAB may be encoded by using a conventional bit-map-based shape coding method such as a context-based arithmetic encoding (CAE) discipline. For instance, in an intra mode, all binary pixels of a BAB are encoded by using an intra CAE discipline to thereby generate an intra coded BAB, wherein a context value for each binary pixel of the BAB in the intra CAE discipline is calculated by using binary pixel values of a predetermined number, e.g., 10 of binary pixels surrounding said each binary pixel in the BAB. While, in an inter mode, all binary pixels of a current BAB is encoded by using an inter CAE discipline to thereby generate an inter encoded BAB, wherein a context value of each binary pixel of the current BAB in the inter CAE discipline is calculated by using binary pixel values of a predetermined number, e.g., 4 of binary pixels surrounding said each binary pixel in the current BAB and binary values of a predetermined number, e.g., 5 of binary pixels within a bordered motion compensated BAB (see MPEG-4 Video Verification Model Version 7.0, International Organisation for Standardisation, Coding of Moving Pictures And Associated Audio Information, ISO/IEC JTC1/SC29/WG11 MPEG97/N1642, Bristol, April 1997, pp 28–30).

Meanwhile, in the conventional binary shape encoding discipline, a mode signal representing or characterizing a corresponding encoding condition for the BAB is encoded to improve the coding efficiency, thereby generating and then transmitting a corresponding encoded mode signal.

For example, if all of the binary pixels within a BAB are object pixels, instead of encoding binary pixel values of the object pixels to generate encoded binary pixel values to be transmitted, it will be preferable to encode a mode signal informing that all of the binary pixels within the BAB are object pixels. By employing the method described above, it is possible to enhance the coding efficiency by transmitting the corresponding encoded mode signal as binary shape information for the BAB.

Referring to Table 1, there are 7 number of modes for the binary alpha information of a BAB according to a conventional mode coding discipline, wherein a motion vector difference for shape (MVD) of the BAB is a difference between a motion vector for shape (MV) and a motion vector predictor for shape (MVP); and the MVP is determined by using a conventional motion estimation discipline (see MPEG-4 Video Verification Model Version 7.0, International Organization for Standardization, Coding of Moving Pictures And Associated Audio Information, ISO/IEC JTC1/SC29/WG11 MPEG97/N1642, Bristol, April 1997, pp 20–23).

TABLE 1

| mode | coding condition |
|---|---|
| 1 | MVD==0 && no_update |
| 2 | MVD!=0 && no_update |
| 3 | MVD==0 && inter_CAE |
| 4 | MVD!=0 && jnter_CAE |
| 5 | intra_CAE |
| 6 | all_0 |
| 7 | all_255 |

In Table 1, mode 1 represents that a motion vector difference for shape (MVD) for the BAB is defined as zero and all the binary pixels within the BAB need not be encoded; mode 2 describes that the MVD is not defined as zero and all the binary pixels within the BAB need not be encoded; mode 3 tells that the MVD is defined as zero and all the binary pixels within the BAB has been encoded by the inter CAE discipline; mode 4 signifies that the MVD is not defined as zero and all the binary pixels within the BAB has been encoded by the inter CAE discipline; mode 5 implies that all the binary pixel within the BAB has been encoded by the intra CAE discipline; mode 6 tells that all the binary pixels within the BAB are defined as background pixels; and mode 7 represents that all the binary pixels within the BAB are defined as object pixels.

Conventional binary shape encoding methods employing the conventional mode coding method described above are basically progressive coding methods. Namely, in the conventional binary shape encoding methods, an interlaced coding technique performed by using field-by-field basis motion estimation method has not been used. Hence, even if spatial and/or temporal correlation between frames is lower than that of fields, the interlaced coding technique has not been employed, thereby limiting the capability of enhancing the coding efficiency thereof.

SUMMARY OF THE INVENTION

It is, therefore, a primary object of the present invention to provide a method and apparatus for coding mode signals efficiently by taking account of the correlation between two fields in an interlaced shape coder.

It is another primary object of the present invention to provide a method and apparatus for coding mode signals efficiently by modifying a bottom mode of the bottom field based on a top mode of the top field.

In accordance with the present invention, there is provided a method for encoding mode signals of a target block of a binary shape signal, wherein the binary shape signal includes a plurality of pictures and each picture is divided into a multiplicity of blocks of M×N pixels having one of a first and a second binary values, the target block representing one of the blocks of a current picture to be encoded and M and N being positive even integers, respectively, comprising the steps of:

(a) generating a first indication signal, if error of the target block with respect to a first reference block is not greater than a predetermined threshold, and generating a second indication signal, if error of the target block with respect to a second reference block is not greater than the predetermined threshold, the respective reference blocks having M×N pixels and all pixels of the first and the second reference blocks being of the first and the second binary values, respectively;

(b) if none of the first and the second indication signals are generated in step (a), dividing the target block into a top field and a bottom field, wherein the top field contains every odd row of the target block to have M/2×N pixels and the bottom field contains every even row of the target block to have M/2×N pixels;

(c) coding the top field to generate a top mode and top field-coded data, wherein the top mode represents a coding condition of the top field-coded data;

(d) coding the bottom field based on the top field-encoded data to generate a bottom mode and bottom field-coded data, wherein the bottom mode represents a coding condition of the bottom field-coded data;

(e) modifying the bottom mode based on the top mode to generate a modified bottom mode; and (f) attaching the top mode to the modified bottom mode to generate a mode.

BRIEF DESCRIPTION OF THE DRAWINGS

The above and other objects and features of the present invention will become apparent from the following description of preferred embodiments given in conjunction with the accompanying drawings, in which:

FIGS. 5A to 5C depict a plurality of candidate pixels for calculating intra, inter and top context values, respectively.

DETAILED DESCRIPTION OF THE PREFERRED EMBODIMENTS

Figure 1:
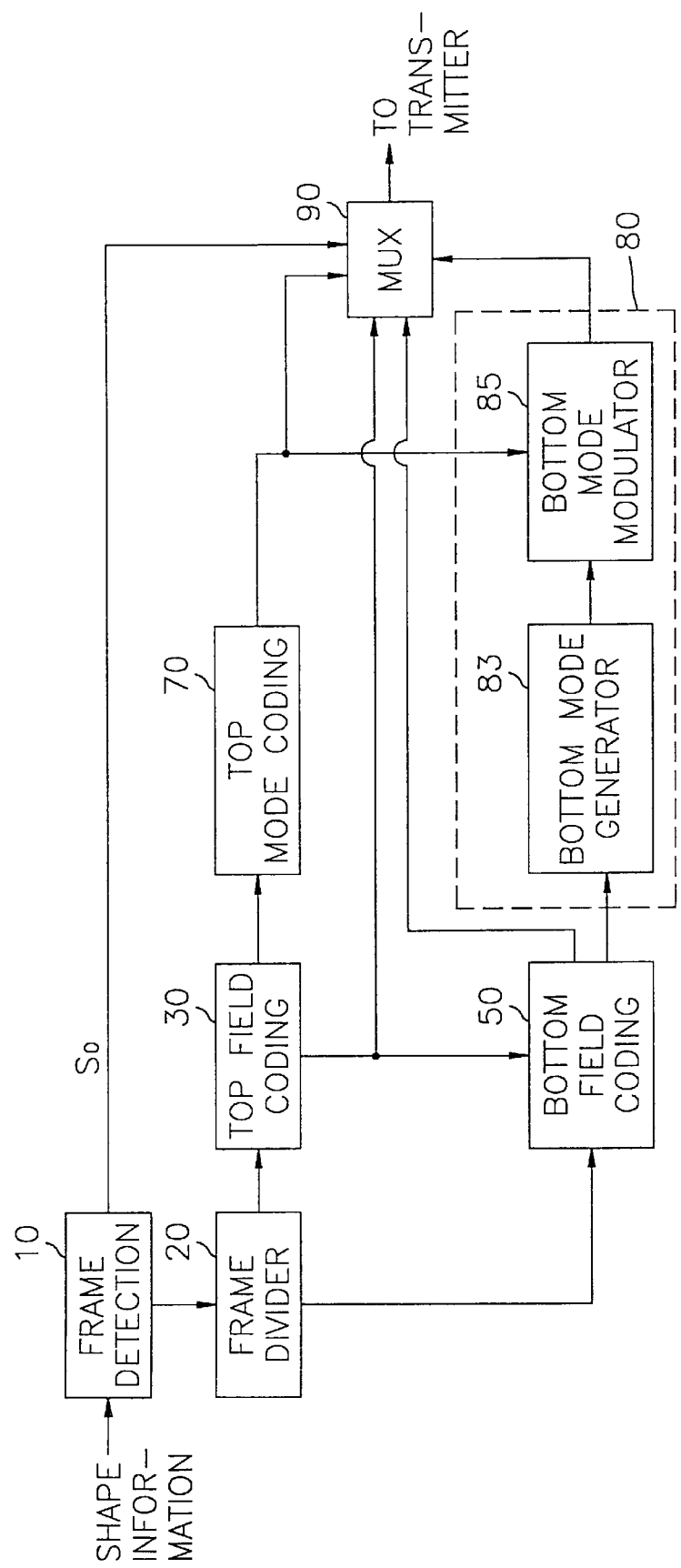
FIG. 1 illustrates an apparatus for coding modes of shape information on a binary alpha block (BAB) basis in accordance with the preferred embodiment of the present invention.

Referring to FIG. 1, there is illustrated an apparatus for coding modes of shape information on a binary alpha block (BAB) basis in an interlaced shape coder in accordance with the preferred embodiment of the present invention, wherein the shape information represented in binary shape signals is referred to as a picture. i.e., an alpha plane. The alpha plane is partitioned into a plurality of binary alpha blocks and the binary alpha blocks are applied as the shape information to a frame detection circuit 10, wherein a binary alpha block (BAB) has M×N binary pixels, M and N being positive even integers typically ranging between 4 and 16.

For simple illustration, assume that the BAB's applied is a predictive picture (P picture), wherein the P picture denotes a picture which is predicted from its previous reference picture.

The frame detection circuit 10 examines whether a coding mode of each BAB is either "all_0" or "all_255". Specifically, a BAB is preferably partitioned into 16 number of subblocks of 4×4 pixels. If all errors between all subblocks of the BAB and an all_0 subblock are smaller than or equal to a predetermined threshold, all the binary pixels of the BAB are changed to background pixels with a pixel value '0' and an indication signal $S_0$='all_0' indicating that the BAB is defined as "all_0" is provided to a multiplexor (MUX) 90, wherein the all_0 subblock is a subblock whose binary pixel values are all '0'. If all errors between all subblocks of the BAB and an all_255 subblock are smaller than or equal to the predetermined threshold, all the binary pixels of the BAB are changed to object pixels with a pixel value '255' and an indication signal $S_0$='all_255' indicating that the BAB is defined as "all_255" is provided to the MUX 90, wherein the all_255 subblock is a subblock whose binary pixel values are all '255'. If the coding mode of the BAB is neither "all_0" nor "all_255", the BAB's of the alpha plane are provided to a frame divider 20.

The frame divider 20 divides said each BAB having M×N binary pixels into a top and a bottom field BAB's, wherein the top field BAB having M/2×N binary pixels contains every odd row of said each BAB and the bottom field BAB having M/2×N binary pixels contains every even row of said each BAB; and provides the top and the bottom field BAB's to a top and a bottom field coding circuits 30 and 50, respectively. If a BAB has 16×16 pixels, it is reasonable that both the top and the bottom field BAB's have 8×16 pixels.

Figure 2:
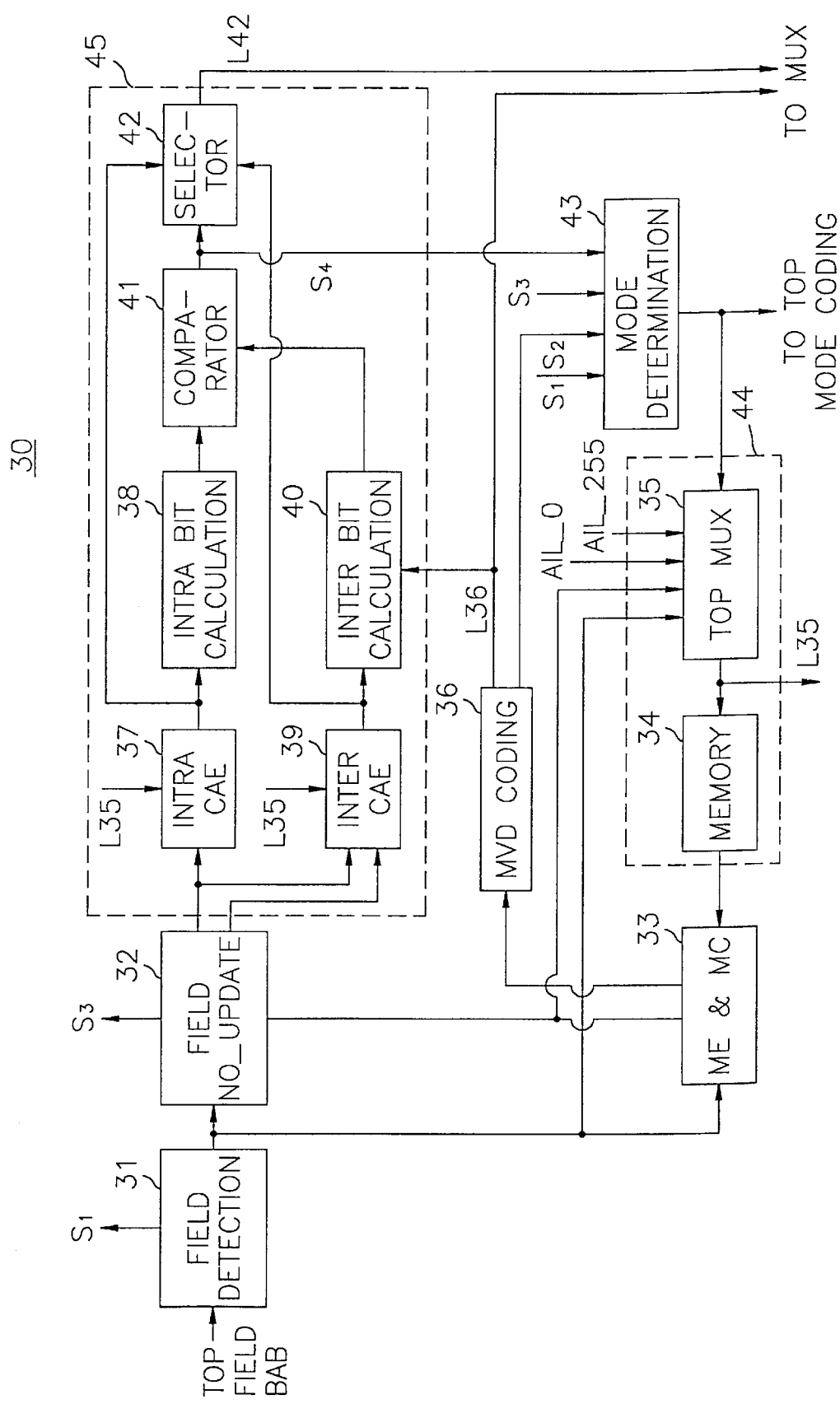
FIG. 2 shows a detailed block diagram of top field coding circuit shown in FIG. 1.

Referring to FIG. 2, there is illustrated a detailed block diagram of the top field coding circuit 30 shown in FIG. 1, wherein the top field BAB is provided as a current field to a field detection circuit 31.

The field detection circuit 31 examines whether a coding mode of the current field is either "all_0" or "all_255" on a field-by-field basis. First of all, the current field having 8×16 pixels is preferably partitioned into 8 number of subblocks of 4×4 pixels. If necessary, the current field can be separated into 16 number of subblocks of 2×4 pixels.

If all errors between all subblocks of the current field and an all_0 subblock are smaller than or equal to the predetermined threshold, all the binary pixels of the current field are changed to background pixels with a pixel value '0' and an indication signal $S_1$='all_0' indicating that the current field is defined as "all_0" is provided to a mode determination circuit 43, wherein the all_0 subblock is a subblock whose binary pixel values are all '0'. If all errors between all subblocks of the current field and an all_255 subblock are smaller than or equal to the predetermined threshold, all the binary pixels of the current field are changed to object pixels with a pixel value '255' and a signal $S_1$='all_255' indicating that the current field is defined as "all_255" is provided to the mode MUX 90, wherein the all_255 subblock is a subblock whose binary pixel values are all '255'. If the coding mode of the current field is either "all_0" or "all_255", an indication signal $S_1$ indicating that the current field is defined as either "all_0" or "all_255" is provided to a mode determination circuit 43. If the coding mode of the current field is neither "all_0" nor "all_255", the current field is provided to a field no_update circuit 32, an ME & MC circuit 33 and a top MUX 35 within a field reconstruction unit 44.

The ME & MC circuit 33 determines a motion vector predictor (MVP) of the current field based on candidate MVP's retrieved from a memory 34 within the field reconstruction unit 44; computes a motion vector (MV) and a motion vector difference (MVD) of the current field; carries out a motion compensation according to the MV to generate a bordered motion compensated (bordered MC) field; and provides the MVD and the bordered MC field to a MVD coding circuit 36 and the field no_update circuit 32, respectively, wherein the MVD represents a displacement between the MV and the MVP; and the bordered MC field represents both a motion compensated field (MC field) obtained by displacing each binary pixel of a previous top/bottom field corresponding to the MVP by the MV and a border of width 1 pixel around the MC field.

The MVD coding circuit 36 generates an MVD signal $S_2$ which indicates whether or not the MVD is equal to '0' and provides the MVD signal $S_2$ to the mode determination circuit 43. If the MVD is not equal to '0', the MVD coding circuit 36 encodes the MVD of the current field to provide the encoded MVD data itself to an inter bit calculation circuit 40 within a context_based arithmetic encoding unit (CAE unit) 45 and a MUX 90 via a line L36.

In the meantime, the field no_update circuit 32 determines whether the current field is identical to the MC field and provides to the mode determination circuit 43 a no_update signal $S_3$ which indicates whether or not the current field must be encoded. First of all, the field no_update circuit 32 separates the current field into the subblocks and partitions the MC field into MC subblocks, wherein each of the MC subblocks has either 2×4 or 4×4 pixels and the MC field is obtained by discarding the border of width 1 pixel around the bordered MC field. The field no_update circuit 32 determines whether each error between each of the subblocks and its corresponding MC subblock is smaller than or equal to the predetermined threshold. If all the errors are smaller than or equal to the predetermined threshold, it is reasonable that the current field need not be encoded so that the signal $S_3$ will signify no_update, i.e., not_encoded.

On the contrary, if one or more errors are greater than the predetermined threshold, i.e., if it is necessary that the current field should be encoded as described below, the field no_update circuit 32 provides the current field to an intra context_based arithmetic encoding (intra CAE) circuit 37 and an inter CAE circuit 39 within the CAE unit 45; and provides the bordered MC field to the inter CAE circuit 39.

The intra CAE circuit 37 encodes all the binary pixels of the current field based on 3 number of adjacent reconstructed fields retrieved via a line L35 from a top MUX 35 within the reconstruction unit 44 by using the conventional intra CAE discipline, wherein each of adjacent reconstructed fields which are adjacent to the current field in a top-left, a top or a left direction, respectively, includes 8×16 reconstructed pixels. In the conventional intra CAE discipline, an intra context value of each binary pixel in the current field in the intra CAE discipline is calculated by using binary pixel values of a predetermined number, e.g., 10 of candidate pixels surrounding said each binary pixel, wherein the candidate pixels are selected among all the reconstructed pixels in the 3 adjacent reconstructed fields and one or more intra encoded pixels, if any, having already been encoded by the intra CAE discipline; and said each binary pixel is encoded based on the intra context value to be provided as an intra encoded pixel for said each binary pixel. Referring to FIG. 5A, there is shown 10 number of candidate pixels $C_0$ to $C_9$ for a binary pixel drawn in a hatched box, wherein a candidate pixel $C_1$ is conventionally encoded earlier than a candidate $C_0$, $C_2$ earlier $C_1$ and so on. The intra encoded pixels are provided as intra CAE data to an intra bit calculation circuit 38 and a selector 42.

The intra bit calculation block 38 calculates the number of bits which are needed to represent the intra CAE data and provides the number of bits of the intra CAE data to a comparator 41.

In the meantime, the inter CAE circuit 39 encodes all binary pixels of the current field based on the adjacent reconstructed fields retrieved via the line L35 and the bordered MC field by using an inter CAE discipline. In the inter CAE discipline, an inter context value of each binary pixel in the current field is calculated by using binary pixel values of a predetermined number, e.g., 4 of reconstructed or inter encoded pixels surrounding said each binary pixel in the current field and binary pixel values of a predetermined number, e.g., 5 of bordered MC pixels within a bordered MC field. Referring to FIG. 5B, there is shown 9 number of candidate pixels $C_0$ to $C_8$ for a binary pixel drawn in a hatched box in the inter CAE discipline, wherein each of the dashed box $C_4$ to $C_8$ represents a bordered MC pixel in the bordered MC field and each of the candidate solid box $C_0$ to $C_3$ represents a reconstructed pixel in the reconstructed field or an inter encoded pixel in the current field. A bordered MC pixel $C_6$ is to the bordered MC field what the binary pixel drawn in the hatched box is to the current field. Said each binary pixel is encoded based on the inter context value to generate an inter encoded pixel for said each binary pixel. All the inter encoded pixels are provided as inter CAE data to the inter bit calculation circuit 40 and the selector 42.

The inter bit calculation circuit 40 calculates the number of bits which are needed to represent both the inter CAE data and the encoded MVD data and provides the same number of bits to the comparator 41.

The comparator 41 compares the number of bits of the intra CAE data with that of the inter CAE data and the encoded MVD data. In the comparator 41, if the number of bits of the intra CAE data is smaller than that of the inter CAE data and the encoded MVD data, an intra/inter signal $S_4$ representing the intra CAE data is provided to the selector 42 and the mode determination circuit 43; and if otherwise, the intra/inter signal $S_4$ representing the inter CAE data and the encoded MVD data is provided.

In response to the intra/inter signal $S_4$, the selector 42 selects either the intra CAE data or the inter CAE data and the encoded MVD data to thereby provide the selected result to the MUX 95 via a line L42.

In the meantime, the mode determination circuit 43 generates a top mode of the current field, i.e., the top field based on the signals $S_1$, $S_2$, $S_3$ and $S_4$ and provides the top mode to the top MUX 35 within the field reconstruction unit 44 and a top mode coding circuit 70 shown in FIG. 1.

In response to the top mode from the mode determination circuit 43, the top MUX 35 reconstructs the current field to generate a reconstructed field. In other words, the top MUX 35 replaces "all_0", "all_255", the current field itself or the MC field among the bordered MC BAB fed from the MC & ME circuit 33 with the reconstructed BAB based on the top mode. The reconstructed field is provided from the top MUX 35 to the memory 34, the intra CAE circuit 37 and the inter CAE circuit 39 via the line L35 for processing a next field. The reconstructed field is also provided to a top CAE circuit 66 and a bottom MUX 55 shown in FIG. 3 via the line L35 for processing a bottom field.

Referring back to FIG. 1, the top mode coding circuit 70 generates a top mode signal for the current BAB based on a conventional statistical coding technique to provide the top mode signal to a bottom mode modulator 85 within a bottom mode coding circuit 80 and the MUX 90. Referring to Table 2, there are exemplarily illustrated 7 number of top mode signals T1 to T7 for the top field BAB in P picture based on the signals $S_1$, $S_2$, $S_3$ and $S_4$, wherein T1 represents a first top mode indicating that a motion vector difference for shape (MVD) for the BAB is defined as zero and all the binary pixels within the BAB need not be encoded and so on.

TABLE 2

| top mode | top mode signal |
|---|---|
| MVD==0 && No_Update (T1) | 11110 |
| MVD!=0 && No_Update (T2) | 110 |
| MVD==0 && inter_CAE (T3) | 10 |
| MVD!=0 && inter_CAE (T4) | 0 |
| intra_CAE (T5) | 1110 |
| all_0 (T6) | 111110 |
| all_255 (T7) | 111111 |

Figure 3:
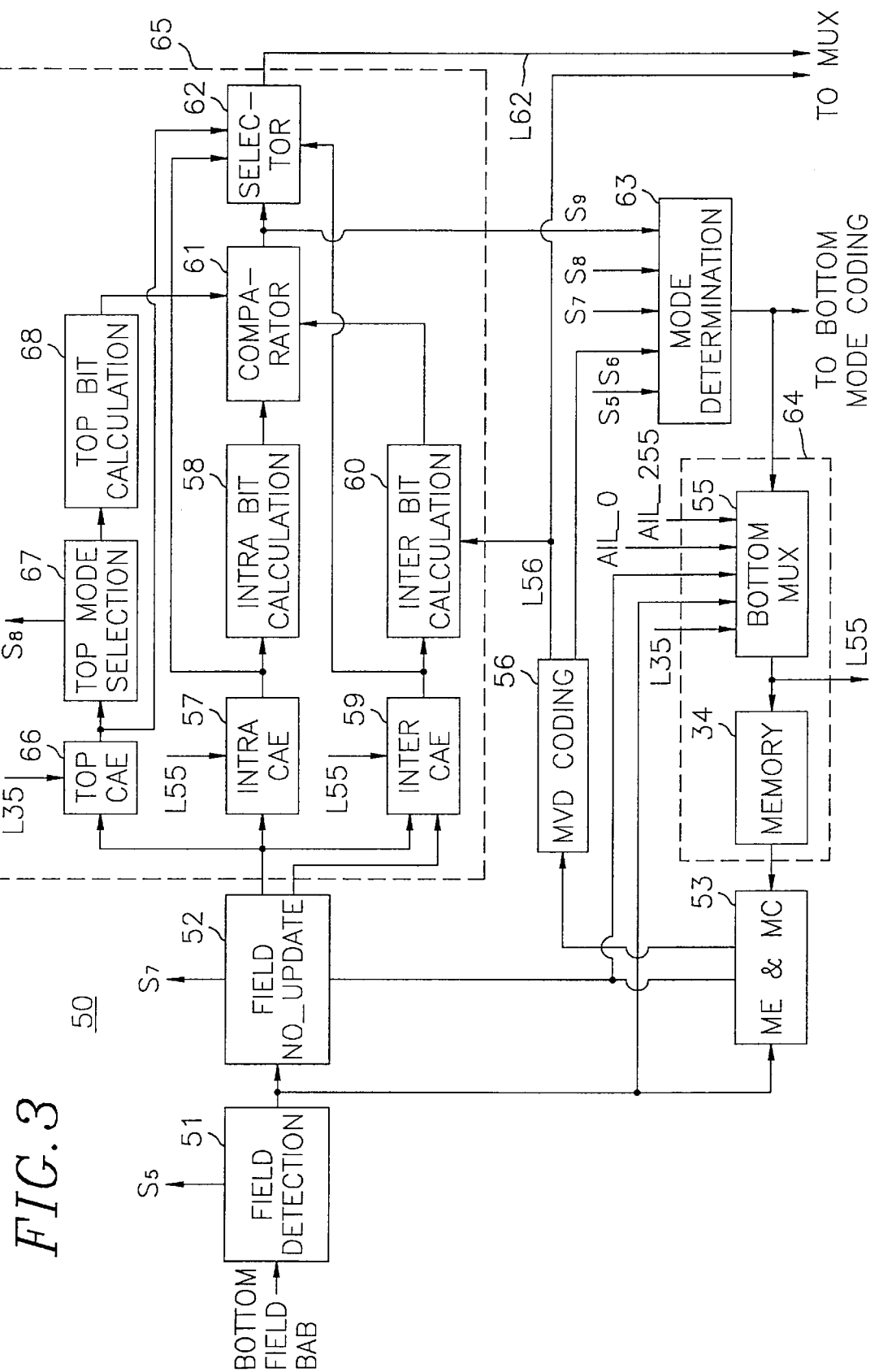
FIG. 3 represents a detailed block diagram of bottom field coding circuit shown in FIG. 1.

In the meantime, referring to FIG. 3, there is illustrated a detailed block diagram of the bottom field coding circuit shown in FIG. 1, wherein the bottom field BAB is provided as another current field to a field detection circuit 51. The bottom field coding circuit 50 is similar to the top field coding circuit 30, except a CAE coding unit 65 and a mode determination circuit 63, so that the bottom field coding circuit is briefly described as follows.

In the field detection circuit 51, an indication signal $S_5$ indicating that the current field is defined as either one of "all_0" and "all_255" is provided to a mode determination circuit 63. If the coding mode of the current field is neither "all_0" nor "all_255", the current field is provided to a field no update circuit 52, an ME & MC circuit 53, and a bottom MUX 55 within a field reconstruction unit 64.

The ME & MC circuit 53 generates a motion vector predictor (MVP) of the current field based on candidate MVP's retrieved from the memory 34 in the field reconstruction unit 64 in accordance with the conventional MPEG-4 discipline, wherein each candidate MVP is preferably selected among reconstructed bottom field's in the memory 34. The memory 34 is commonly owned by the top field coding circuit 30 and the bottom field coding circuit 50. After computing the MV and the MVD of the current field, the ME & MC circuit 53 provides the MVD and a bordered MC field to a MVD coding circuit 56 and the field no_update circuit 52, respectively.

The MVD coding circuit 56 which is substantially identical to the MVD coding circuit 36 provides to the mode determination circuit 63 an MVD signal $S_6$ indicating whether or not the MVD is equal to '0' and encodes the MVD of the current field, if any, to provide the encoded MVD data itself to an inter bit calculation circuit 60 and the MUX 90 via a line L56.

In the meantime, the field no_update circuit 52 provides a no_update signal $S_7$ to the mode determination circuit 63, wherein the no_update signal $S_7$ indicates whether or not the current field is identical to the MC field so that the current field must be encoded. If the current must be encoded as described below, the field no_update circuit 52 provides the current field and the bordered MC field to the CAE coding unit 65 in a similar manner described before for the top field coding circuit 30, except further providing the current field to a top CAE circuit 66.

The CAE coding unit 65 is similar to the CAE unit 45 shown in FIG. 2, except that it further includes the top CAE circuit 66, a top mode selection circuit 67 and a top bit calculation circuit 68. In other words, an intra CAE circuit 57 calculates an intra context value for each binary pixel of the current field by using binary pixel values of a predetermined number, e.g., 10 of candidate pixels $C_0$ to $C_9$ surrounding said each binary pixel as shown in FIG. 5A according to the intra CAE discipline; and encodes said each binary pixel based on the intra context value to generate intra encoded data. An inter CAE circuit 59 also calculates an inter context value of each binary pixel in the current field by using binary pixel values of a predetermined number, e.g., 4 of reconstructed or inter encoded pixels $C_0$ to $C_3$ surrounding said each binary pixel in the current field and binary pixel values of a predetermined number, e.g., 5 of bordered MC pixels $C_4$ to $C_8$ within a bordered MC field as shown in FIG. 5B; and encodes each binary pixel based on the inter context value to generate inter encoded data.

In the meantime, the top CAE circuit 66 encodes all binary pixels of the current field based on a reconstructed top field retrieved via the line L35 by using a top CAE discipline in accordance with the present invention. First of all, for said each binary pixel, i.e., a bottom pixel, a predetermined number, e.g., 6 of reconstructed top pixels for said each binary pixel are detected as top field context pixels based on the position of said each binary pixel in the original BAB before being divided into the top/bottom field. Referring to FIG. 5C, there is shown 7 number of candidate pixels $C_0$ to $C_6$ for a binary pixel drawn in a hatched box in the inter CAE discipline, wherein each of the dashed box $C_1$ to $C_6$ represents a top field context pixel in the reconstructed top field and a solid box $C_0$ represents a top encoded pixel within the current field, i.e., the bottom field BAB. A top field context pixel $C_5$ is to the top field what said each binary pixel drawn in hatched box is to the bottom field. After calculating a top context value of each binary pixel in the current field by using the binary pixel values of 7 number of candidate pixels as detected above, the top CAE circuit 66 encodes said each binary pixel based on the top context value to generate a top encoded pixel for said each binary pixel. All the inter encoded pixels are provided as top CAE data to a top mode selection circuit 67 and the selector 62.

The top mode selection circuit 67 provides a no_update_top signal $S_8$ to the mode determination circuit 63, wherein the no_update_top signal $S_8$ indicates whether or not the top CAE data which is predicted based on the top field context pixels in the current field, i.e., in the bottom field BAB is substantially identical to the top field BAB. If the bottom field BAB is identical to the top field BAB, an indication signal $S_8$ represents "not coded with prediction"

Referring back to FIG. 1, the bottom mode generator 83 in the bottom mode coding circuit 80 generates a bottom mode signal for the current bottom field based on the conventional statistical coding technique. The bottom mode signal is applied to the bottom mode modulator 85 for being modulated by the top mode signal. The bottom mode modulator 85 generates a modified bottom mode signal depending on the top mode signal.

TABLE 3

| | | top mode | | | | | | |
|---|---|---|---|---|---|---|---|---|
| | | T1 | T2 | T3 | T4 | T5 | T6 | T7 |
| bottom mode | B1 | 110 | 0 | 1110 | 11110 | 1111110 | 11110 | 11110 |
| | B2 | 0 | 110 | 11110 | 1110 | 111110 | 111110 | 111110 |
| | B3 | 1110 | 11110 | 0 | 110 | 11110 | 110 | 110 |
| | B4 | 11110 | 1110 | 110 | 0 | 1110 | 1110 | 1110 |
| | B5 | 1111110 | 1111110 | 1111110 | 1111110 | 0 | 10 | 10 |
| | B6 | 11111110 | 11111110 | 11111110 | 11111110 | 11111110 | x | 111111 |
| | B7 | 11111111 | 11111111 | 11111111 | 11111111 | 11111111 | 111111 | x |
| | B8 | 10 | 10 | 10 | 10 | 10 | x | x |
| | B9 | 111110 | 111110 | 111110 | 111110 | 1110 | 0 | 0 | and, if otherwise, an indication signal S8 represents "coded with top field context", i.e., the top CAE data. If the top CAE data is different from the top field BAB, the top mode selection circuit 67 provides the top CAE data to a top bit calculation circuit 68.

The intra bit calculation 58, the inter bit calculation circuit 60 and the top bit calculation circuit 68 calculate the number of bits for the intra CAE data, that of the inter CAE data as well as the encoded MVD data and that of the top CAE data, respectively, and the numbers of bits are provided to a comparator 61 to be compared with each other.

From the comparator 61, an intra/inter/top signal $S_9$ that tells which of the intra CAE data, the inter CAE data and the top CAE data has a smallest number of bits is provided to the selector 62 and the mode determination circuit 63. In response to the intra/inter/top signal $S_9$, the selector 62 selects one of the intra CAE data, the inter CAE data and the top CAE data to thereby provide the selected result to the MUX 90 via a line L62.

In the meantime, the mode determination circuit 63 generates a field coding mode of the current field based on the signals $S_5$, $S_6$, $S_7$, $S_8$ and $S_9$, wherein the field coding mode is selected among 9 field coding modes including, in addition to the conventional 7 modes in the MPEG-4, 2 more special modes, i.e., "coded with top field context" and "not coded with prediction", and provides the field coding mode to the bottom MUX 55 within the reconstruction unit 64 and a bottom mode generator 83 within the bottom mode coding circuit 80 shown in FIG. 1.

In response to the field coding mode from the mode determination circuit 63, the bottom MUX 55 reconstructs the current field. i.e., the bottom field BAB. In other words, in response to the field coding mode, in the bottom MUX 55, one of the "all_0" field, the "all_255" field, the current field itself fed from the field detection circuit 51, the MC field fed from the ME & MC circuit 53 and the top field fed from the top MUX 35 is replaced with the reconstructed field for the current field. The reconstructed field is provided from the bottom MUX 55 to the memory 34, intra CAE circuit 57 and the inter CAE circuit 59 via the line L55 for the processing of next bottom field data.

Referring to Table 5, there are exemplarily illustrated 59 number of modified bottom mode signals for the bottom field modified by the 7 top mode signals, wherein Bi is to the bottom field what Ti is to the top field, i being 1 to 7 and B8 and B9 represent "coded with top field context" and "not coded with prediction", respectively. For the sixth top mode T6, there is no sixth bottom mode B6, i.e., "all_0" in the bottom mode, because the "all_0" for the frame BAB has already been checked in the frame detection circuit 10.

Referring back to FIG. 1, the MUX 90 multiplies the indication signal $S_0$, the top mode signal, the bottom mode signal, the top encoded data by the bottom encoded data to provide a transmitter (not drawn) for transmission.

Figure 4:
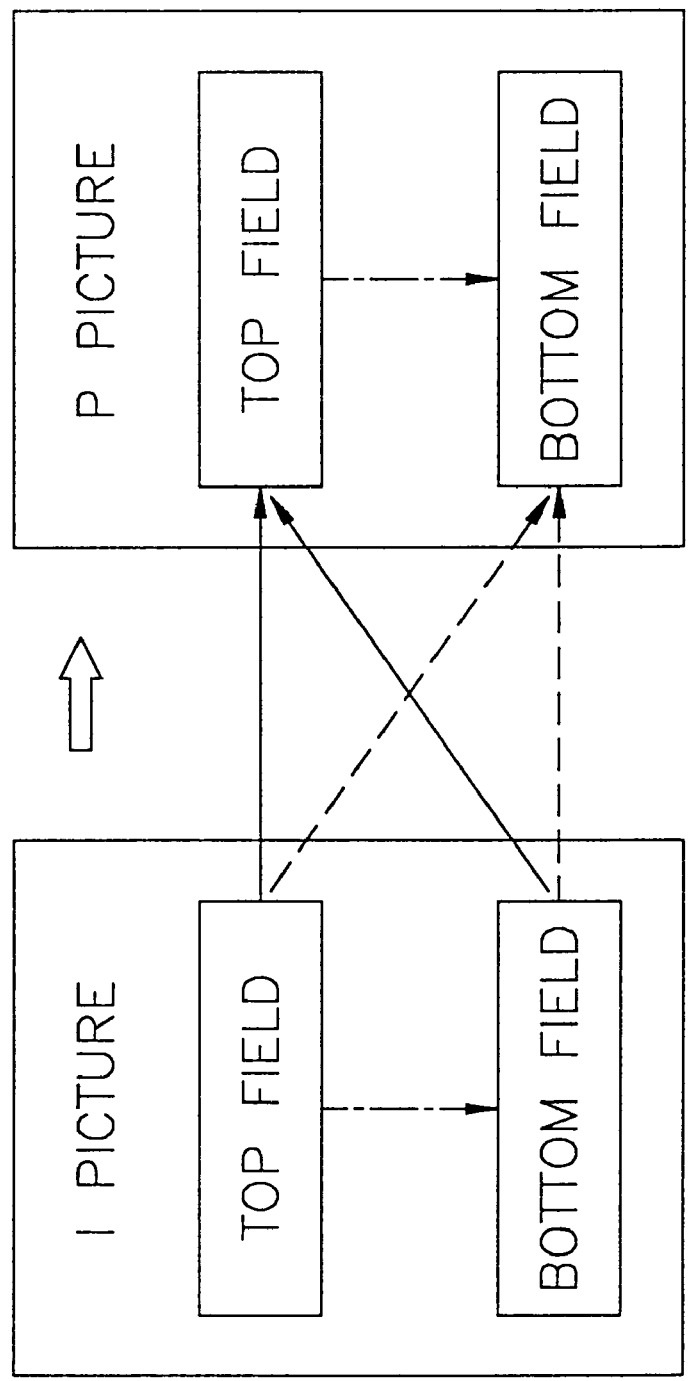
FIG. 4 presents a correlation between the top field and the bottom field in I/P picture.

Referring to FIG. 4, there is illustrated a correlation between the top field and the bottom field in I/P picture in accordance with the present invention, wherein I picture is encoded without taking account of any other reference picture and the P picture is predicted from its previous reference picture. In the I picture, the top field is encoded by only the intra coding discipline, while the bottom field can be encoded by either the intra coding discipline or the top coding discipline shown in a dot-and-dash line. In contrast, in the P picture, the top field can be encoded by either the intra coding discipline or the inter coding discipline shown in a solid line, while the bottom field can be encoded by one of the intra coding discipline, the inter coding discipline shown in a dashed line and the top coding discipline shown in a dot-and-dash line.

While the present invention has been described with respect to certain preferred embodiments only, other modifications and variations may be made without departing from the spirit and scope of the present invention as set forth in the following claims.

What is claimed is:

1. A method for encoding mode signals of a target block of a binary shape signal, wherein the binary shape signal includes a plurality of pictures and each picture is divided into a multiplicity of blocks of M×N pixels having one of a first and a second binary values, the target block representing one of the blocks of a current picture to be encoded and M and N being positive even integers, respectively, comprising the steps of:

(a) generating a first indication signal, if error of the target block with respect to a first reference block is not greater than a predetermined threshold, and generating a second indication signal, if error of the target block with respect to a second reference block is not greater than the predetermined threshold, the respective reference blocks having M×N pixels and all pixels of the first and the second reference blocks being of the first and the second binary values, respectively;

(b) if none of the first and the second indication signals are generated in step (a), dividing the target block into a top field and a bottom field, wherein the top field contains every odd row of the target block to have M/2×N pixels and the bottom field contains every even row of the target block to have M/2×N pixels;

(c) coding the top field to generate a top mode and top field-coded data, wherein the top mode represents a coding condition of the top field-coded data;

(d) coding the bottom field based on the top field-encoded data to generate a bottom mode and bottom field-coded data, wherein the bottom mode represents a coding condition of the bottom field-coded data;

(e) modifying the bottom mode based on the top mode to generate a modified bottom mode; and (f) attaching the top mode to the modified bottom mode to generate a mode.

2. The method according to claim 1, wherein the step (c) includes the steps of:

(c1) generating a first top indication signal if error of the top field with respect to a first reference field is not greater than a predetermined threshold, and generating a second top indication signal if error of the top field with respect to a second reference field is not greater than a predetermined threshold, the respective reference fields having M/2×N pixels and all pixels of the first and the second reference fields being of the first and the second binary values, respectively;

(c2) if the first and the second top indication signals are not generated in step (c1), motion estimating and compensating the top field with reference to one or more previous pictures of the current picture to thereby generate motion vector information including a motion vector and a motion compensated field, wherein the motion compensated field includes a most similar field to the top field;

(c3) calculating a motion compensation error (MCE) between the top field and the most similar field and a motion vector difference(MVD) between the motion vector and its predictor;

(c4) creating a top MVD signal, wherein the top MVD signal indicates whether or not the MVD is zero;

(c5) encoding the MVD, if the MVD is not zero, to generate MVD data;

(c6) setting a top no_update signal, wherein the top no_update signal indicates whether or not the MCE is smaller than the predetermined threshold;

(c7) if the MCE is not smaller than the predetermined threshold, producing intra-coded data and inter-coded data, wherein the intra-coded data is generated by encoding the pixels of the top field based on predetermined pixels of the top field and the inter-coded data is provided by encoding the pixels of the top field based on preset pixels included in the top field and the motion compensated field;

(c8) generating an intra/inter signal, wherein the intra/inter signal is generated when either the intra-coded data or the inter-coded data is selected; and (c9) determining the top mode based on the first/second top indication signals, the top MVD signal, the top no_update signal and/or the intra/inter signal.

3. The method according to claim 2, the step (c8) has the steps of:

(c81) calculating the number of bits of the intra-coded data and that of the inter-coded data;

(c82) comparing the number of bits of the intra-coded data with that of the inter-coded data to select a smallest number of bits;

(d83) in response to the smallest number of bits, producing the intra/inter signal, wherein the intra/inter signal tells whether or not the number of bits of the intra-coded data is smaller than that of the inter-coded data; and (c84) in response to the intra/inter signal, providing either the intra-coded data or the inter-coded data as top field-coded data.

4. The method according to claim 2, wherein the intra-coded data is provided by an intra-context based arithmetic encoding (CAE) method and the inter-coded data is provided by an inter-CAE method.

5. The method according to claim 2, wherein the step (d) includes the steps of:

(d1) generating a first bottom indication signal if error of the bottom field with respect to a first reference field is not greater than a predetermined threshold, and generating a second bottom indication signal if error of the bottom field with respect to a second reference field is not greater than a predetermined threshold, the respective reference fields having M/2×N pixels and all pixels of the first and the second reference fields being of the first and the second binary values, respectively;

(d2) if the first and the second bottom indication signals are not generated in step (d1), motion estimating and compensating the bottom field with reference to one or more previous pictures of the current picture to thereby generate motion vector information including a motion vector and a motion compensated field, wherein the motion compensated field includes a most similar field to the bottom field;

(d3) calculating a motion compensation error (MCE) between the bottom field and the most similar field and a motion vector difference (MVD) between the motion vector and its predictor;

(d4) creating a bottom MVD signal, wherein the bottom MVD signal indicates whether or not the MVD is zero;

(d5) encoding the MVD, if the MVD is not zero, to generate MVD data;

(d6) setting a bottom no_update signal, wherein the bottom no_update signal indicates whether or not the MCE is smaller than the predetermined threshold;

(d7) if the MCE is not smaller than the predetermined threshold, producing intra-coded data, inter-coded data and top-coded data, wherein the intra-coded data is generated by encoding the pixels of the bottom field based on predetermined pixels of the bottom field; the inter-coded data is generated by encoding the pixels of the bottom field based on preset pixels included in the bottom field and the motion compensated field; and the top-coded data is provided by encoding the pixels of the bottom field based on predestined pixels included in the top field;

(d8) generating an intra/inter/top signal, wherein the intra/inter/top signal is generated when either of the intra-coded data, the inter-coded data and the top-coded data is selected; and (d9) determining the bottom mode based on the first and the second bottom indication signals, the bottom MVD signal, the bottom no_update signal and/or the intra/inter/top signal.

6. The method according to claim 5, wherein the step (d8) has the steps of;

(d81) calculating the number of bits of the intra-coded data, that of the inter-coded data and the top-coded data;

(d82) comparing the number of bits of the intra-coded data, that of the inter-coded data and that of the top-coded data to select a smallest number of bits;

(d83) in response to the smallest number of bits, producing the intra/inter/top signal, wherein the intra/inter/top signal tells which number of bits is a smallest among those of the intra-coded data, the inter-coded data and the top-coded data; and (d84) in response to the intra/inter/top signal, producing one of the intra-coded data, the inter-coded data and the top-coded data as bottom field-coded data.

7. The method according to claim 5, wherein step (d) further includes the steps of:

(d10) comparing the top-coded data of the bottom field with the top field to generate a top-related signal, wherein the top-related signal represents whether or not the top-coded data is substantially identical to the top field; and (d11) modifying the bottom mode based on the "not coded with prediction" to generate a modified bottom mode.

8. The method according to claim 5, wherein the intra-coded data is provided by an intra-context based arithmetic encoding (CAE) method and the inter-coded data is provided by an inter-CAE method.

9. An apparatus for encoding mode signals of a target block of a binary shape signal, wherein the binary shape signal includes a plurality of pictures and each picture is divided into a multiplicity of blocks of M×N pixels having one of a first and a second binary values, the target block representing one of the blocks of a current picture to be encoded and M and N being positive even integers, respectively, comprises:

frame detection means for generating a first indication signal, if error of the target block with respect to a first reference block is not greater than a predetermined threshold, and generating a second indication signal, if error of the target block with respect to a second reference block is not greater than the predetermined threshold, the respective reference blocks having M×N pixels and all pixels of the first and the second reference blocks being of the first and the second binary values, respectively;

frame divider for dividing the target block into a top field and a bottom field, wherein the top field contains every odd row of the target block to have M/2×N pixels and the bottom field contains every even row of the target block to have M/2×N pixels;

top field coder for coding the top field to generate a top mode and top field-coded data, wherein the top mode represents a coding condition of the top field-coded data;

bottom field coder for coding the bottom field based on the top field-encoded data to generate a bottom mode and bottom field-coded data, wherein the bottom mode represents a coding condition of the bottom field-coded data;

bottom mode modulator for modifying the bottom mode based on the top mode to generate a modified bottom mode; and multiplexor for attaching the top mode to the modified bottom mode to generate a mode.

10. The apparatus according to claim 9, wherein the top field coder includes:

means for generating a first top indication signal if error of the top field with respect to a first reference field is not greater than a predetermined threshold, and generating a second top indication signal if error of the top field with respect to a second reference field is not greater than a predetermined threshold, the respective reference fields having M/2×N pixels and all pixels of the first and the second reference fields being of the first and the second binary values, respectively;

means for motion estimating and compensating the top field with reference to one or more previous pictures of the current picture to thereby generate motion vector information including a motion vector and a motion compensated field, wherein the motion compensated field includes a most similar field to the top field;

means for calculating a motion compensation error(MCE) between the top field and the most similar field and a motion vector difference (MVD) between the motion vector and its predictor;

means for creating a top MVD signal, wherein the top MVD signal indicates whether or not the MVD is zero;

means for encoding the MVD, if the MVD is not zero, to generate MVD data;

means for setting a top no_update signal, wherein the top no_update signal indicates whether or not the MCE is smaller than the predetermined threshold;

intra/inter encoder for producing intra-coded data and inter-coded data, wherein the intra-coded data is generated by encoding the pixels of the top field based on predetermined pixels of the top field and the inter-coded data is provided by encoding the pixels of the top field based on preset pixels included in the top field and the motion compensated field;

intra/inter signal generator for generating an intra/inter signal, wherein the intra/inter signal is generated when either the intra-coded data or the inter-coded data is selected; and means for determining the top mode based on the first/second top indication signals, the top MVD signal, the top no_update signal and/or the intra/inter signal.

11. The apparatus according to claim 10, the intra/inter signal generator has:

means for calculating the number of bits of the intra-coded data and that of the inter-coded data;

means for comparing the number of bits of the intra-coded data with that of the inter-coded data to select a smallest number of bits;

in response to the smallest number of bits, means for producing the intra/inter signal, wherein the intra/inter signal tells whether or not the number of bits of the intra-coded data is smaller than that of the inter-coded data; and in response to the intra/inter signal, means for providing either the intra-coded data or the inter-coded data as top field-coded data.

12. The apparatus according to claim 10, wherein the intra-coded data is provided by an intra-context based arithmetic encoding (CAE) method and the inter-coded data is provided by an inter-CAE method.

13. The apparatus according to claim 10, wherein the bottom field coder includes:

means for generating a first bottom indication signal if error of the bottom field with respect to a first reference field is not greater than a predetermined threshold, and generating a second bottom indication signal if error of the bottom field with respect to a second reference field is not greater than a predetermined threshold, the respective reference fields having M/2×N pixels and all pixels of the first and the second reference fields being of the first and the second binary values, respectively;

means for motion estimating and compensating the bottom field with reference to one or more previous pictures of the current picture to thereby generate motion vector information including a motion vector and a motion compensated field, wherein the motion compensated field includes a most similar field to the bottom field;

means for calculating a motion compensation error (MCE) between the bottom field and the most similar field and a motion vector difference (MVD) between the motion vector and its predictor;

means for creating a bottom MVD signal, wherein the bottom MVD signal indicates whether or not the MVD is zero;

means for encoding the MVD, if the MVD is not zero, to generate MVD data;

means for setting a bottom no_update signal, wherein the bottom no_update signal indicates whether or not the MCE is smaller than the predetermined threshold;

intra/inter/top encoder for producing intra-coded data, inter-coded data and top-coded data, wherein the intra-coded data is generated by encoding the pixels of the bottom field based on predetermined pixels of the bottom field; the inter-coded data is generated by encoding the pixels of the bottom field based on preset pixels included in the bottom field and the motion compensated field; and the top-coded data is provided by encoding the pixels of the bottom field based on predestined pixels included in the top field;

intra/inter/top signal generator for generating an intra/inter/top signal, wherein the intra/inter/top signal is generated when either of the intra-coded data, the inter-coded data and the top-coded data is selected; and means for determining the bottom mode based on the first and the second bottom indication signals, the bottom MVD signal, the bottom no_update signal and/or the intra/inter/top signal.

14. The apparatus according to claim 13, wherein the intra/inter/top signal generator has:

means for calculating the number of bits of the intra-coded data, that of the inter-coded data and the top-coded data;

means for comparing the number of bits of the intra-coded data, that of the inter-coded data and that of the top-coded data to select a smallest number of bits;

in response to the smallest number of bits, means for producing the intra/inter/top signal, wherein the intra/inter/top signal tells which number of bits is a smallest among those of the intra-coded data, the inter-coded data and the top-coded data; and in response to the intra/inter/top signal, means for producing one of the intra-coded data, the inter-coded data and the top-coded data as bottom field-coded data.

15. The apparatus according to claim 13, wherein bottom field coder further includes:

means for comparing the top-coded data of the bottom field with the top field to generate a top-related signal, wherein the top-related signal represents whether or not the top-coded data is substantially identical to the top field; and means for modifying the bottom mode based on the "not coded with prediction" to generate a modified bottom mode.

16. The apparatus according to claim 13, wherein the intra-coded data is provided by an intra-context based arithmetic encoding (CAE) method and the inter-coded data is provided by an inter-CAE method.

* * * * *